United States Patent [19]

Miyoshi et al.

[11] 4,198,592
[45] Apr. 15, 1980

[54] CIRCUIT FOR STABILIZING ELECTRON BEAM FOCUSING OF AN ELECTROMAGNETIC FOCUSING TYPE CAMERA TUBE

[75] Inventors: Tadayoshi Miyoshi; Shintaro Nakagaki; Itsuo Takanashi, all of Yokohama; Koichiro Motoyama, Ninomiya; Sumio Yokokawa, Yokohama; Kenichi Miyazaki, Sagamihara, all of Japan

[73] Assignee: Victor Company of Japan, Limited, Yokohama, Japan

[21] Appl. No.: 941,870

[22] Filed: Sep. 13, 1978

[30] Foreign Application Priority Data

Sep. 16, 1977 [JP] Japan .................................. 52-111394

[51] Int. Cl.$^2$ ............................................. H01J 29/58
[52] U.S. Cl. ................................ 315/382; 315/31 TV
[58] Field of Search ............................. 315/31 TV, 382

[56] References Cited

U.S. PATENT DOCUMENTS

| | | | |
|---|---|---|---|
| 3,422,305 | 1/1969 | Infante | 315/382 |
| 3,772,566 | 11/1973 | Schwartz | 315/382 X |
| 3,924,156 | 12/1975 | Doran et al. | 315/382 |

Primary Examiner—Malcolm F. Hubler

[57] ABSTRACT

A circuit for stabilizing electron beam focusing is used for an electromagnetic focusing type camera tube having a high voltage generating circuit for supplying electrodes of the camera tube. A focusing current is supplied to an electron beam focusing coil of the camera tube. The focusing current supply circuit comprises an operational amplifier having an output terminal to which the focusing coil is connected. A detection resistor is connected between the focusing coil and an inverting input terminal of the operational amplifier. A first resistor is connected between the voltage source and a non-inverting input terminal of the operational amplifier. A second resistor is connected between a reference voltage source and the non-inverting input terminal of the operational amplifier.

5 Claims, 5 Drawing Figures

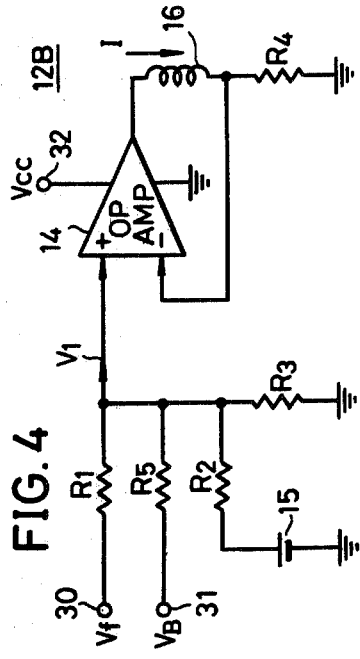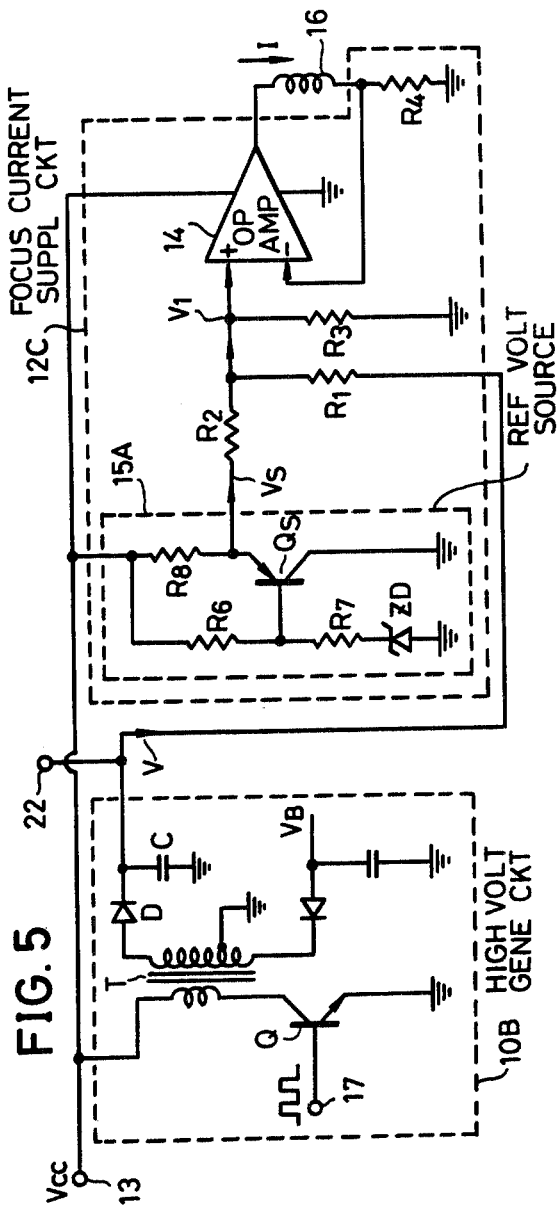

CIRCUIT FOR STABILIZING ELECTRON BEAM FOCUSING OF AN ELECTROMAGNETIC FOCUSING TYPE CAMERA TUBE

BACKGROUND OF THE INVENTION

The present invention relates generally to circuits for image pickup tubes of the electromagnetic focusing type. More particularly, it relates to a simple circuit capable of stabilizing an electron beam focusing in an electromagnetic focusing type camera tube. This stabilization utilizes the relationship between the voltage of the focusing electrode and the current in the focusing coil of the camera tube.

In general, the focusing of the electron beam of an electromagnetic focusing type camera tube is determined by the mutual relationship between the voltage of the focusing electrode and the current flowing through the focusing coil of the camera tube.

More specifically, the focusing magnetic field is created in the focusing coil by the focusing current flowing therethrough. The electric field is created by the voltage applied to the focusing electrode and has the greatest effect on the variation of the focus point (electrical focus point) of the electron beam. The other electrodes of the camera tube have only a small effect upon the focusing of the electron beam.

Accordingly, in order to attain good focusing, it has heretofore been a practice to provide a separate high voltage generating circuit for supplying voltage to parts such as the focusing electrodes and a separate circuit for supplying current to the focusing coil. This separation increases their stability. However, in order for these circuits to have high stability, a great number of expensive parts are necessary, whereby the costs and prices of these circuits become disadvantageously high.

Furthermore, if there is a fluctuation in the voltage of the power source for the high voltage generating circuit and focusing current supplying circuit, their output voltages fluctuate with the same fluctuation ratio. The focusing of the electron beam changes in response to this fluctuation of the power source voltage. Furthermore, the focusing of the electron beam is also affected by other factors. Accordingly, it has heretofore been necessary to adjust controls whenever the focusing state of the electron beam varies because of fluctuation of the power source voltage or for some other cause.

The analytical considerations leading to the present invention will now be set forth. The electrical focal distance f, when the electromagnetic focusing camera tube is in its optimum focusing state, is expressed by the following equation in terms of the above mentioned voltage V of the focusing electrodes and the magnetic flux density B of the magnetic field in the focusing coil:

$$f = K \frac{V}{\int_{\infty}^{\infty} B^2 x \, dx} \tag{1}$$

The constant K in this Eq. (1) is expressed by the following equation in terms of the mass m of the electrons and the energy e of the electrons:

$$K = 8m/e \tag{2}$$

The quantity Bx in the denominator on the right-hand side of Eq.(1) can be considered to be constant because the magnetic field in the focusing coil is uniform. Accordingly, Eq.(1) can be simplified as follows:

$$f \approx K(V/B^2) \tag{3}$$

The magnitude of the magnetic flux density B is proportional to the magnitude of the current I flowing through the focusing coil. Accordingly, the electrical focal distance f of the optimum focusing state can be expressed as follows, in terms of the focusing electrode voltage V and the focusing current I:

$$f \propto V/I^2 \tag{4}$$

As is apparent from Eq.(4), in an electromagnetic focusing camera tube, the position of the electrical focus point does not fluctuate as long as the quantity $V/I^2$ is constant. Then, if there is the relationship given by the following equation between the current regulation $K_I$ of the focusing coil current I and the voltage regulation $K_V$ of the focusing electrode voltage V, the position of the electrical focus point cannot fluctuate:

$$(1+K_I)^2 = 1+K_V \tag{5}$$

A first-degree approximation of Eq.(5) produces the following equation:

$$2K_I = K_V \tag{6}$$

Therefore, it can be concluded that, in an electromagnetic focusing camera tube, substantially no fluctuation occurs in the position of the electrical focus point even when there are small fluctuations in the focusing electrode voltage V and the focusing coil current I, provided that the condition expressed by Eq.(6) is valid. Accordingly, the present invention is based on a utilization of this relationship.

SUMMARY OF THE INVENTION

It is a general object of the present invention to provide a novel and useful circuit arrangement which is capable of stabilizing the electron beam focusing of an electromagnetic focusing type camera tube in which the above described difficulties have been overcome.

Another and specific object of the invention is to provide a circuit arrangement for increasing the focusing stability of the electron beam through a utilization of the relationship between the voltage of the focusing electrode and the focusing coil current of the electromagnetic focusing type camera tube.

Still another object of the invention is to provide a circuit having a specific relationship between the rate of variation of the output current of a circuit for supplying a focusing current to the focusing coil of the electromagnetic focusing type camera tube and the rate of variation of the power supply voltage. With this relationship no fluctuation arises in the focus point position of the electron beam even when there is a fluctuation in the power source voltage.

Other objects and further features of the present invention will be apparent from the following detailed description with respect to preferred embodiments of the invention when read in conjunction with the accompanying drawings.

BRIEF DESCRIPTION OF THE DRAWINGS

In the drawings:

FIG. 4 is a circuit diagram of the part for supplying focusing current in a third embodiment of the invention; and FIG. 5 is a circuit diagram of a fourth embodiment of the invention.

DETAILED DESCRIPTION

Figure 1:
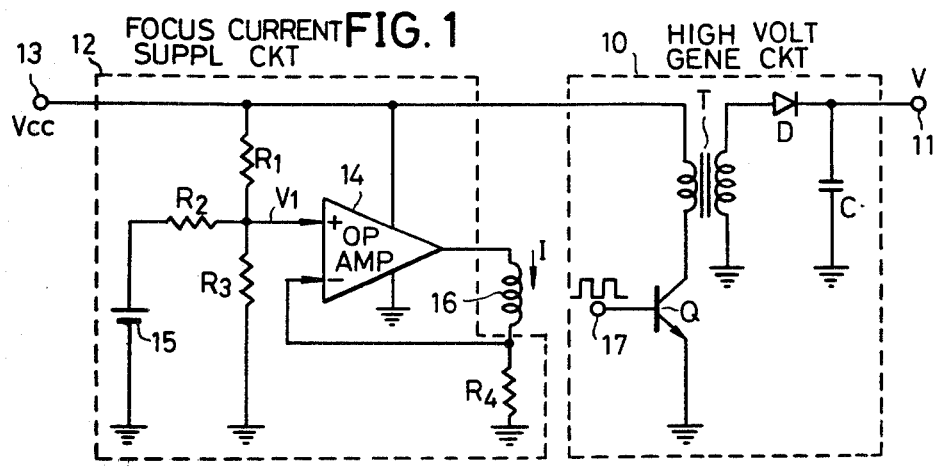
FIG. 1 is a circuit diagram of a first embodiment of the invention for an electromagnetic focusing type camera tube.

FIG. 1 shows the first embodiment of a circuit according to the invention for an electromagnetic focusing type, camera tube. A high voltage generating circuit 10 comprises a switching transistor Q for operating in response to pulses supplied to its base, a boosting transformer T, a diode D for rectification, and a capacitor C for smoothing, and has a circuit similar to that of a known high voltage generating circuit.

In a focusing current supply circuit 12, a resistor R1 is connected between a terminal 13 to which a power source voltage Vcc for operation is applied and a non-inverting input terminal of an operational amplifier 14. A resistor R2 is connected between a reference voltage source 15 and the non-inverting input terminal of the operational amplifier 14. A resistor R3 is connected between ground (earth) and the junction point between the resistors R1 and R2. A series-connected combination of a focusing coil 16 and a resistor R4 (for detecting a focusing current) is connected between the output terminal of the operational amplifier 14 and the ground. The junction point between the focusing coil 16 and the resistor R4 is connected to an inverting input terminal of the operational amplifier 14. In a known circuit, the reference voltage source 15 and the resistor R2 are not connected.

In the high voltage generating circuit 10, the power source voltage Vcc supplied through the terminal 13 is passed through the primary winding of the boosting transformer T and applied to the collector of the transistor Q. The transistor Q switches ON and OFF in response to pulses applied to its base from a terminal 17. In response to this operation, the voltage generated in the secondary winding of the boosting transformer T is rectified and smoothed by the diode D and the capacitor C, and an output voltage V is obtained through a terminal 11. Since the load on the high voltage generating circuit 10 is substantially constant, the value of the output voltage V fluctuates with a regulation which is substantially equal to the voltage regulation of the power source voltage Vcc.

On the one hand, the output current I of the operational amplifier 14 of the focusing current supply circuit 12 is expressed by the following equation, in terms of a comparison voltage V1 applied to the non-inverting input terminal of the operational amplifier 14 and the resistance value of the detection resistor R4.

$$I = V1/R4 \quad (7)$$

In order to satisfy the condition of $2K_I = K_V$ in Eq.(6), the voltage regulation of the comparison voltage V1, applied to the non-inverting input terminal of the operational amplifier 14, is set at one half of the voltage of the power source voltage Vcc. This can be realized by suitably selecting the resistance ratio of the resistor R1 connected to the terminal 13 of the power source voltage Vcc and the resistor R2 connected to the reference voltage source 15.

The relationship between the reference voltage V1 and the resistance values of the resistors R1, R2, and R3 is represented by the following equation:

$$V1 = \frac{R2 \cdot R3 \cdot Vcc + R1 \cdot R3 \cdot Vs}{R1 \cdot R2 + R2 \cdot R3 + R3 \cdot R1}$$

where Vs is the voltage of the reference voltage source 15. And, at the time when $$\frac{\frac{\Delta V1}{V1}}{\frac{\Delta Vcc}{Vcc}} = \frac{\frac{\Delta V1}{V1}}{\frac{\Delta Vs}{Vs}} = \frac{1}{2} \quad (8)$$

the circuit shown in FIG. 1 satisfies the conditions of Eq.(6). That is, from $$\Delta V1 = \frac{\delta V1}{\delta Vcc} \Delta Vcc + \frac{\delta V1}{\delta Vs} \Delta Vs,$$

the above Eq.(8) becomes as follows (when $\Delta Vs = 0$):

$$\frac{R2 \cdot R3 \cdot Vcc}{R2 \cdot R3 \cdot Vcc + R1 \cdot R3 \cdot Vs} = 0.5 \quad (9)$$

When $\Delta Vcc = 0$, Eq.(8) becomes as follows:

$$\frac{R1 \cdot R3 \cdot Vs}{R2 \cdot R3 \cdot Vcc + R1 \cdot R3 \cdot Vs} = 0.5 \quad (10)$$

By selecting the resistance of the resistors R1, R2, and R3 to satisfy the Eqs.(9) and (10), Eq.(6) is satisfied. A constantly optimum electron beam focusing is obtained, independently of the fluctuation of the power source voltage Vcc.

Figure 2:
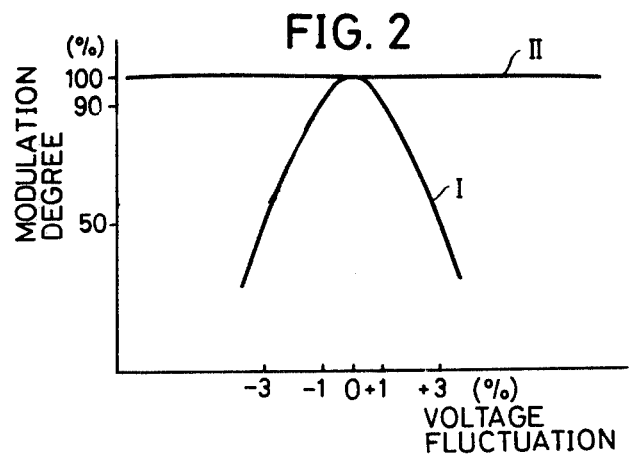
FIG. 2 is a graph indicating a characteristic of modulation with respect to power source voltage regulation.

FIG. 2 gives a comparison between the variations of the electron beam focusing with respect to voltage fluctuations of the power source voltage Vcc, occurring in the circuit of the present invention and a known circuit. In this graph of FIG. 2, the abscissa represents fluctuation (%) of the voltage of the power source voltage Vcc, while the ordinate represents modulation degree (%) of the output signal of the camera tube when it is picking up an image of an object having a constant space frequency. This modulation degree is indicated as being 100% in the optimum state of electron beam focusing of the camera tube.

In FIG. 2, curve I is the characteristic curve of the known circuit, while curve II (actually a substantially straight line) is the characteristic curve of the circuit of the present invention. As is apparent from the curve I, in the known circuit, the modulation degree becomes 90%, which is a deterioration of 10%, when the voltage of the power source voltage Vcc fluctuates ±1%, for example. Furthermore, when the voltage Vcc fluctuates ±3%, for example, the modulation degree becomes 50%, which is a great deterioration of 50%. In contrast, in the circuit of the present invention, as is apparent from curve II, the modulation degree undergoes almost no deterioration, even when the power source voltage Vcc fluctuates. For example, even when the voltage Vcc fluctuates greatly (up to a fluctuation of the order of ±5%), the deterioration of the modulation degree is extremely small, being of such a small order that it is almost undetectable. Accordingly, it is apparent that, by the present invention, stabilization of the electron beam focusing of an electromagnetic focusing type camera tube can be accomplished in a highly satisfactory manner.

Thus, in the circuit of the invention, the output voltage V fluctuates substantially the same as the power source voltage Vcc fluctuates. The voltage of the electrodes of the camera tube also fluctuate substantially the same as the power source voltage Vcc fluctuates. The electron beam focusing current supplied from the focusing current supplying circuit 12 to the focusing coil 16 fluctuates with a regulation which is one half of the fluctuation of the power source voltage Vcc. Thus the conditions of the above Eq.(6) are satisfied. Even when a fluctuation occurs in the power source voltage Vcc, there is no variation in the position of the focus point of the electron beam of the camera tube. Therefore, the focusing of the electron beam is continually maintained in the optimum state, unaffected by fluctuations of the power source voltage Vcc.

Strictly considered, if the saturation voltage between the collector and emitter of the transistor Q of the high voltage generating circuit 10 fluctuates as a result of temperature variation, or where the resistance values of the windings of the boosting transformer T fluctuate as a result of temperature variation, there is the possibility that the above Eq.(6) is no longer satisfied. This failure to satisfy Eq.(6) can be prevented by measures (such as the use of a transistor) wherein the temperature caused variation of the saturation voltage between a collector and emitter is small for the transistor Q. It is also possible to use thick wire in the windings of the boosting transformer T.

However, since apparatus such as a color television camera for home use must be as inexpensive as possible, it may be necessary to use a transistor Q and a boosting transformer T of poor temperature characteristics for a camera. In such a case, the electron beam focusing deteriorates, although slightly, as a result of a fluctuation of the power source voltage Vcc.

Figure 3:
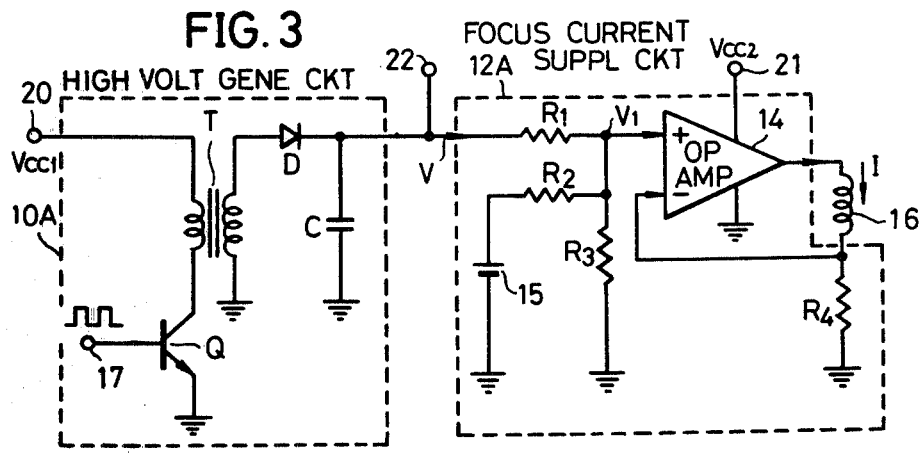
FIG. 3 is a circuit diagram of a second embodiment of the circuit according to the invention.

Accordingly, this problem is solved in a second embodiment of the invention, as described below and as illustrated in FIG. 3. In FIG. 3, those parts which are the same as corresponding parts in FIG. 1 are designated by like reference numerals and characters. Detailed description of such parts will be omitted. The high voltage generating circuit 10A in this embodiment of the invention is the same as the high voltage generating circuit 10 of the preceding embodiment of the invention. A power source voltage Vcc1 is applied through a terminal 20 to the primary winding of the boosting transformer T. The output voltage V of the high voltage generating circuit 10 is supplied to the focusing current supplying circuit 12A and, after passing through the resistor R1, is applied as a voltage V1 to the non-inverting input terminal of the operational amplifier 14. This focusing current supplying circuit 12A also is the same as the focusing current supplying circuit 12 in the preceding embodiment of the invention. A power source voltage Vcc2 is applied through a terminal 21 to the operational amplifier 14.

Here, the resistance values of the resistors R1 and R2 are so selected that the output current I of the focusing current supplying circuit 12A will fluctuate with the regulation of the output voltage V of the high voltage generating circuit 10A, that is, with a regulation equal to ½ of the regulation of the electrode voltage of the camera tube. As a result, in the circuit illustrated in FIG. 3, even if the characteristic responses of the constituent elements of the high voltage generating circuit 12A vary as a result of excessive variation of the source voltage, the position of the focus point of the electron beam of the camera tube will not vary. This will be apparent from a consideration of Eqs.(8), (9), and (10) described in connection with the preceding embodiment of the invention when the power source voltage Vcc in these equations is substituted by the output voltage V of the high voltage generating circuit 10A.

To prevent fluctuation of the focus point position, the resistance values of the resistors R1 and R2 are selected to satisfy Eq.(6). The comparison voltage V1 applied to the non-inverting input terminal of the operational amplifier 14 is proportional to ½ of the value indicated by Eq.(6) and of voltage V1. When resistors R1, R2 are energized by the output voltage V of the high voltage generating circuit 10A and the voltage Vs of the reference voltage source 15, the focus point position of the electron beam is prevented from fluctuating, even when the power source voltage fluctuates.

In the circuit shown in FIG. 3, the power source Vcc1 and the power source Vcc2 may be either separate or common power sources.

The above described embodiments of the invention relate to the case where the electrode voltages applied from the high voltage generating circuit to the electrodes of the camera tube all fluctuate with the same ratio and in the same direction in response to fluctuation of the power source voltage. This is very convenient in the case of an ordinary circuit wherein the voltages supplied to the electrodes of the camera tube are obtained from the same high voltage generating circuit. However, in the case where the voltages of the electrodes of the camera tube respectively fluctuate separately with respect to a fluctuation of the power supply voltage, a slight fluctuation occurs in the focus point position of the electron beam when there is a fluctuation of the power source voltage. Furthermore, a variation in the focus point position of the electron beam is caused also by a variation in the initial velocity conditions occurring when the electron beam quantity is set by adjusting the first grid voltage of the camera tube.

A focusing current supplying circuit 12B (constituting an essential part of an embodiment of the invention which solves this problem) is illustrated in FIG. 4. In this circuit 12B, a voltage Vf of a focusing electrode voltage source of the camera tube is applied to a terminal 30 connected to the resistor R1. A voltage $V_B$ of a power source for setting the adjustment of the electron beam quantity is applied to a terminal 31. A resistor R5 is connected between the terminal 31 and the junction point between the resistors R1, R2, and R3. Here, by appropriately selecting the relative resistance values of the resistors R1, R2, and R3, fluctuation of the focus point of the electron beam of the camera tube can be effectively prevented, irrespective of fluctuations of the power source voltage.

In each of the circuits of the above described embodiments of the invention, the drawings show the the reference voltage source 15 by a DC battery symbol. This is usually a circuit having a constant voltage regulated by the use of a Zener diode. However, as is known, the Zener voltage of a Zener diode varies with temperature.

Accordingly, in the embodiment of the invention described below with reference to FIG. 5, the circuits are so devised that the reference voltage Vs of the reference voltage source 15 will not vary even when there is a temperature variation. The reference voltage source 15A of the focusing current supplying circuit 12C comprises a transistor Qs, resistors R6, R7, and R8, and a Zener diode ZD. The potential dividing circuit of the resistors R6 and R7 is so adapted that the variation of the Zener voltage due to temperature variation of the Zener diode ZD is exactly canceled by the variation of the voltage $V_{BE}$ between the base and emitter of the transistor Qs, responsive to temperature variation. At the emitter of the transistor Qs, the reference voltage Vs is continually constant despite any temperature variations. This output reference voltage Vs of the reference voltage source 15A is applied, via the resistor R2, to the non-inverting input terminal of the operational amplifier 14.

Furthermore, the high voltage generating circuit 10B of the present embodiment of the invention is so adapted that the voltage V is derived via the diode D from one terminal of the secondary winding of the boosting transformer T, while the voltage $V_B$ is derived via a diode from another terminal of the secondary winding of the boosting transformer T. In addition, an intermediate part of the secondary winding of this boosting transformer T is grounded.

Further, this invention is not limited to these embodiments. Variations and modifications may be made without departing from the scope of the invention.

What is claimed is:

1. In an electromagnetic focusing type camera tube having high voltage generating means for supplying an operational voltage to electrodes of the camera tube, an electron beam focusing coil on said tube, means for supplying a focusing current to said focusing coil on the camera tube, and voltage source means for applying voltage to said high voltage generating circuit and to said focusing current supply means, said focusing current supply means comprising an operational amplifier having an output terminal connected to one end of said focusing coil, the other end of said coil being connected to an inverting input of said operational amplifier, a detection resistor connected between ground and said other end of focusing coil, a first resistor connected between said voltage source means and a non-inverting input terminal of said operational amplifier, a reference voltage source, and a second resistor connected between said reference voltage source and said non-inverting input terminal of the operational amplifier.

2. In an electromagnetic focusing type camera tube having high voltage generating means for supplying an operational voltage to electrodes of the camera tube, an electron beam focusing coil on said tube, means for supplying a focusing current to said focusing coil on the camera tube, and voltage source means for applying voltage to said high voltage generating circuit and to said focusing current supply means, said focusing current supply means comprising an operational amplifier having an output terminal connected to one end of said focusing coil, the other end of said focusing coil being connected to an inverting input of said operational amplifier, a detection resistor connected between ground and said other end of said focusing coil, a first resistor connected between an output side of said voltage generating means and a non-inverting input terminal of said operational amplifier, a reference voltage source, and a second resistor connected between said reference voltage source and said non-inverting input terminal of the operational amplifier.

3. A circuit arrangement for an electromagnetic focusing type camera tube as claimed in claim 1 in which the resistance ratio of said first and second resistors is such that the current regulation $K_I$ of the current I flowing through said focusing coil and the voltage regulation $K_V$ of the voltage V of said focusing electrodes have the relationship expressed by the equation $2K_I = K_V$.

4. In an electromagnetic focusing type camera tube having high voltage generating means for supplying a operational voltage to electrodes of the camera tube, an electron beam focusing coil on said tube, means for supplying a focusing current to said electron beam focusing coil on the camera tube, first voltage source means for applying voltage to said high voltage generating means and to said focusing current supply means, second voltage source means for applying a voltage to a focusing electrode in said tube, and power source means for regulating and setting an electron beam quantity, said focusing current supply means comprising an operational amplifier having an output terminal connected to one end of said focusing coil, the other end of said focusing coil being connected to an inverting input on said operational amplifier, a detection resistor connected between ground and said other end of said focusing coil, a first resistor connected between said first voltage source means and a non-inverting input terminal of said operational amplifier, a reference voltage source, a second resistor connected between said reference voltage source and said non-inverting input terminal of the operational amplifier, and a third resistor connected between said power source means and the non-inverting input terminal of the operational amplifier.

5. A circuit arrangement for an electromagnetic focusing type camera tube as claimed in claim 1 in which said reference voltage source comprises a transistor having the voltage from the voltage source means applied across its base and emitter, and a Zener diode connected in a base circuit of said transistor.

* * * * *

UNITED STATES PATENT AND TRADEMARK OFFICE
CERTIFICATE OF CORRECTION

PATENT NO. : 4,198,592
DATED : April 15, 1980
INVENTOR(S) : TADAYOSHI MIYOSHI ET AL.

It is certified that error appears in the above-identified patent and that said Letters Patent are hereby corrected as shown below:

Column 7, line 46, claim 1, "focusing coil" should read --said focusing coil--.

Column 8, line 10, claim 2, "said voltage" should read --said high voltage--.

Column 8, line 25, claim 4, "a" should read --an--;

line 39, claim 4, "on" should read --of--.

Signed and Sealed this

Ninth Day of September 1980

[SEAL]

Attest:

SIDNEY A. DIAMOND

*Attesting Officer*     *Commissioner of Patents and Trademarks*